United States Patent
Hasanov et al.

(10) Patent No.: US 10,216,587 B2
(45) Date of Patent: Feb. 26, 2019

(54) SCALABLE FAULT TOLERANT SUPPORT IN A CONTAINERIZED ENVIRONMENT

(71) Applicant: INTERNATIONAL BUSINESS MACHINES CORPORATION, Armonk, NY (US)

(72) Inventors: Khalid Hasanov, Dublin (IE); Pierre Lemarinier, Leixlip (IE); Muhammad M. Rafique, Dublin (IE); Srikumar Venugopal, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 15/331,281

(22) Filed: Oct. 21, 2016

(65) Prior Publication Data
US 2018/0113770 A1  Apr. 26, 2018

(51) Int. Cl.
G06F 11/00 (2006.01)
G06F 11/14 (2006.01)

(52) U.S. Cl.
CPC ........ *G06F 11/1471* (2013.01); *G06F 11/142* (2013.01); *G06F 2201/805* (2013.01); *G06F 2201/82* (2013.01); *G06F 2201/84* (2013.01)

(58) Field of Classification Search
CPC .................................................... G06F 11/142
See application file for complete search history.

(56) References Cited

U.S. PATENT DOCUMENTS

| | | | |
|---|---|---|---|
| 8,010,961 B1 * | 8/2011 | Cook | G06F 9/455 707/783 |
| 9,298,788 B1 | 3/2016 | Kekre et al. | |
| 9,766,945 B2 * | 9/2017 | Gaurav | G06F 9/5077 |
| 9,870,288 B2 * | 1/2018 | Zhao | G06F 11/1446 |
| 2007/0244937 A1 | 10/2007 | Flynn, Jr. et al. | |
| 2011/0173169 A1 | 7/2011 | Chandrasekaran et al. | |
| 2011/0208928 A1 * | 8/2011 | Chandra | G06F 11/1466 711/162 |
| 2015/0006487 A1 * | 1/2015 | Yang | G06F 9/461 707/649 |
| 2015/0254240 A1 | 9/2015 | Li et al. | |
| 2017/0083541 A1 * | 3/2017 | Mann | G06F 3/065 |
| 2017/0177441 A1 * | 6/2017 | Chow | G06F 11/1407 |
| 2017/0262299 A1 * | 9/2017 | Chow | G06F 9/455 |
| 2018/0032410 A1 * | 2/2018 | Kang | G06F 11/1469 |
| 2018/0074748 A1 * | 3/2018 | Makin | G06F 3/0647 |

FOREIGN PATENT DOCUMENTS

| | | |
|---|---|---|
| WO | 02073416 A2 | 9/2002 |
| WO | 2008103287 A1 | 8/2008 |
| WO | 2013102812 A1 | 7/2013 |

OTHER PUBLICATIONS

Dobson et al., "A Container-Based Approach to Fault Tolerance in Service-Oriented Architectures," International Conference of Software Engineering Citeseer, 2005 (10 pages).

* cited by examiner

*Primary Examiner* — Christopher S McCarthy

(74) *Attorney, Agent, or Firm* — Griffiths & Seaton PLLC

(57) ABSTRACT

Embodiments for providing failure tolerance to containerized applications by one or more processors. A layered filesystem is initialized to maintain checkpoint information of stateful processes in separate and exclusive layers on individual containers. A most recent checkpoint layer is transferred from a main container exclusively to an additional node to maintain an additional, shadow container.

15 Claims, 7 Drawing Sheets

SCALABLE FAULT TOLERANT SUPPORT IN A CONTAINERIZED ENVIRONMENT

BACKGROUND OF THE INVENTION

Field of the Invention

The present invention relates in general to computing systems, and more particularly to, various embodiments for providing scalable fault tolerant support in a containerized environment.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, and other devices. Accordingly, the use of computers, network appliances, and similar data processing devices continue to proliferate throughout society.

SUMMARY OF THE INVENTION

Various embodiments providing failure tolerance to containerized applications by one or more processors, are provided. In one embodiment, by way of example only, a method for providing failure tolerance to containerized applications by one or more processors is provided. A layered filesystem is initialized to maintain checkpoint information of stateful processes in separate and exclusive layers on individual containers. A most recent checkpoint layer is transferred from a main container exclusively to an additional node to maintain an additional, shadow container.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
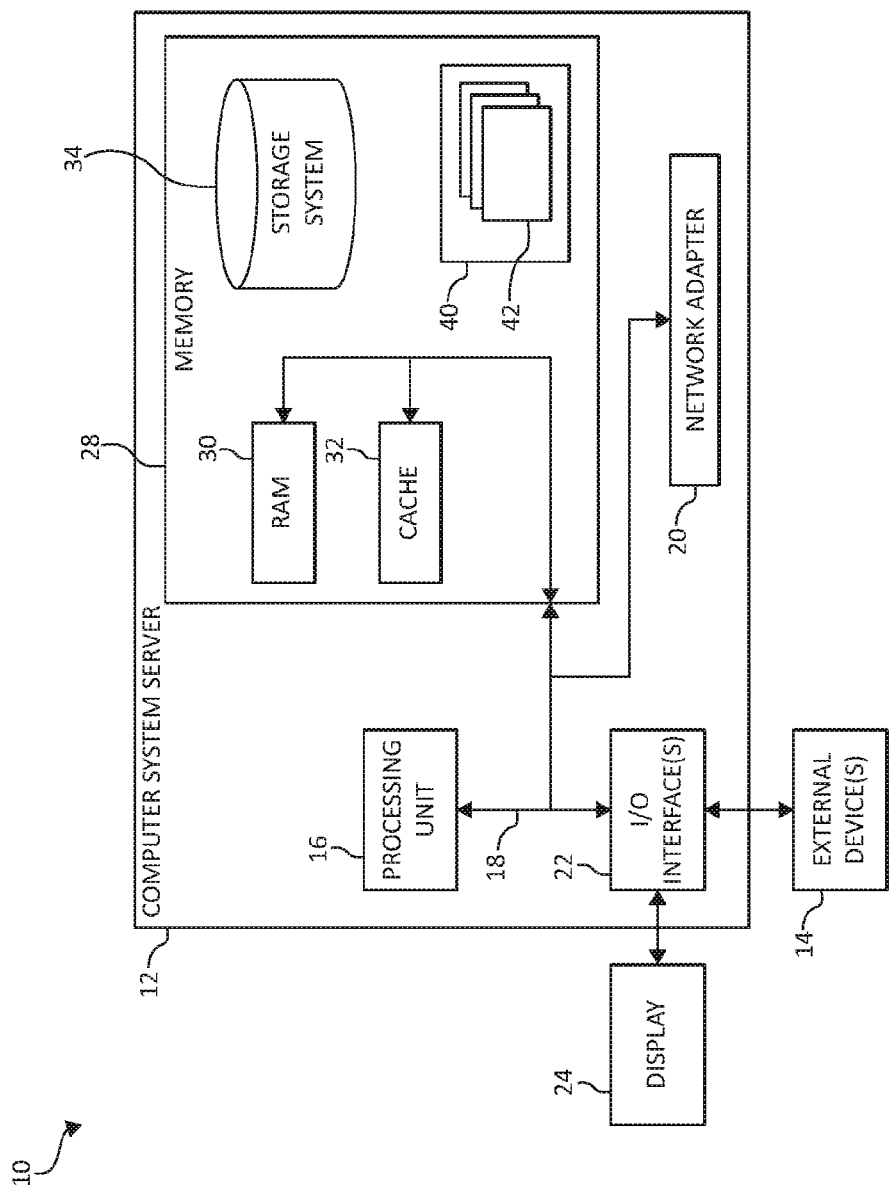
FIG. 1 is a block diagram depicting an exemplary computing node according to an embodiment of the present invention.

So called application "containerization" is an operating system level (OS-level) virtualization method for deploying and running distributed applications without launching an entire virtual machine (VM) for each application. Instead, multiple isolated systems are run on a single control host and access a single kernel. The application containers hold the components such as files, environment variables and libraries necessary to run the desired software. Because resources are shared in this way, application containers may be created that place less strain on the overall computing resources available. For example, if a variation to a particular application is desired, a container may be created that holds only the new library of the variation.

Containerization may result in efficiency gains in memory, processing, and storage compared to traditional virtualization. Because application containers do not have the overhead required by VM's, it is possible to support many more containers on the same infrastructure. Application containers may also be migrated to other computing environments, such as computing systems, clouds, or other components without requiring code changes. Accordingly, a potential benefit of application containers includes portability across various platforms.

While containers may be used in computing environments for single, stateless services deployment and isolation, an ongoing effort aims at making use of containers for tightly coupled, distributed application in, for instance, high-performance computing systems. Failure mitigation of tightly coupled applications generally includes checkpointing each process state into separated files, and when a fault is detected, restarting the entire application using these checkpoint files.

Managing checkpoint files, detecting failures, and requesting more resources when nodes fail is traditionally handled by application developers and users. It is envisioned, however, that such tightly coupled distributed applications will run in containers in the future. Accordingly, a need exists for mechanisms making use of container orchestration and layered file systems to accommodate checkpoint file migration and resource allocation in a transparent manner.

The mechanisms of the illustrated embodiments, as will be described, provide, among other aspects, support for user-driven checkpointing for container applications in a manner not previously available. Such user-driven checkpointing is beneficial for high-performance computing applications developed using the Message Passing Interface (MPI) standard.

In one embodiment, the mechanisms of the present invention utilize the layered filesystem concept to capture checkpoints, thereby requiring no modification of existing container applications. To promote failure mitigation, a so-called "shadow container" is then initialized on a target node, and endowed with the captured checkpoints from the original containerized application in the event of a failure of the original containerized application. As will be further described, such checkpoint migration is transparent and leverages filesystem replication that is already supported in most data centers.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
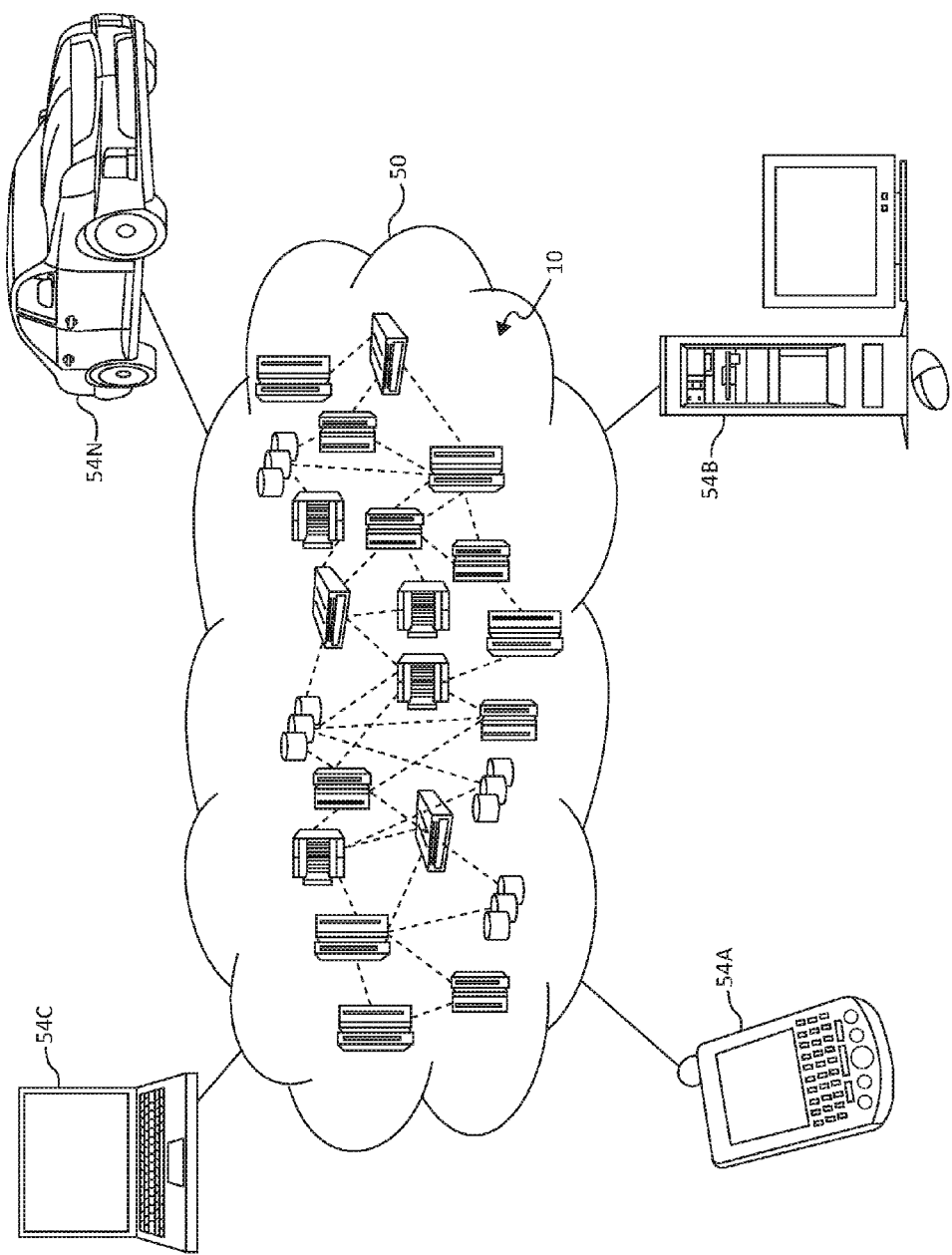
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
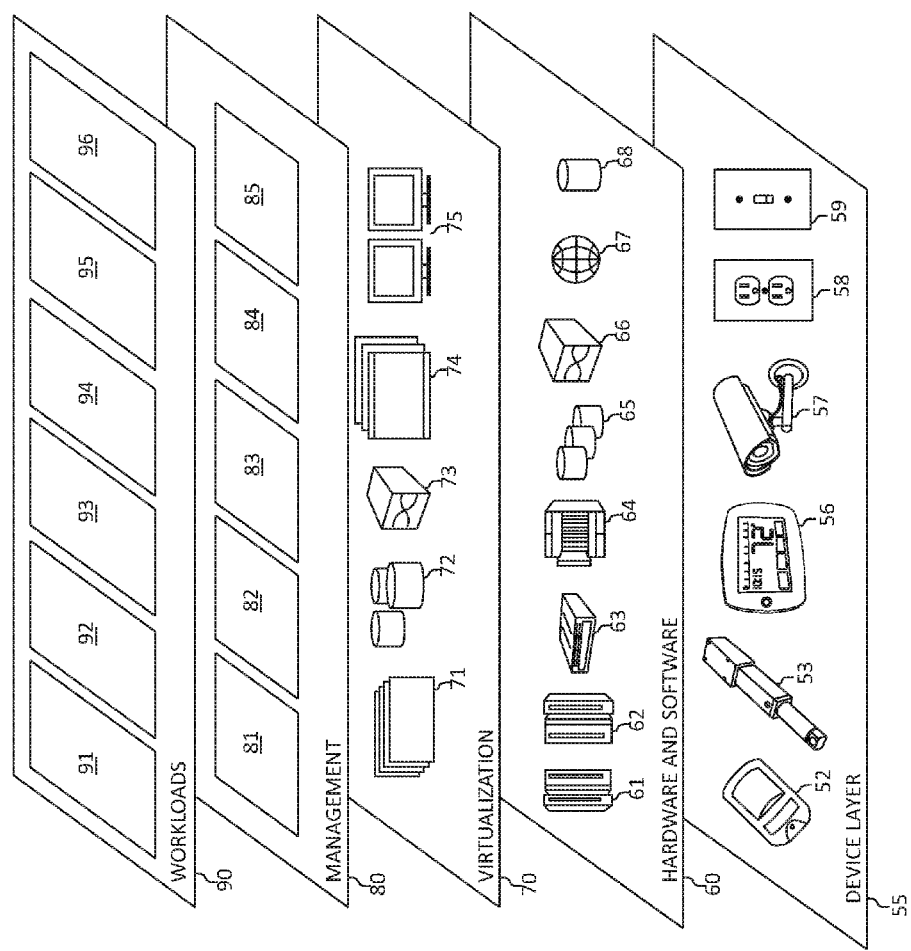
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various failure mitigation workloads and functions 96. In addition, failure mitigation workloads and functions 96 may include such operations as checkpointing using a layered filesystem and data migration operations as will be further described. One of ordinary skill in the art will appreciate that the failure mitigation workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
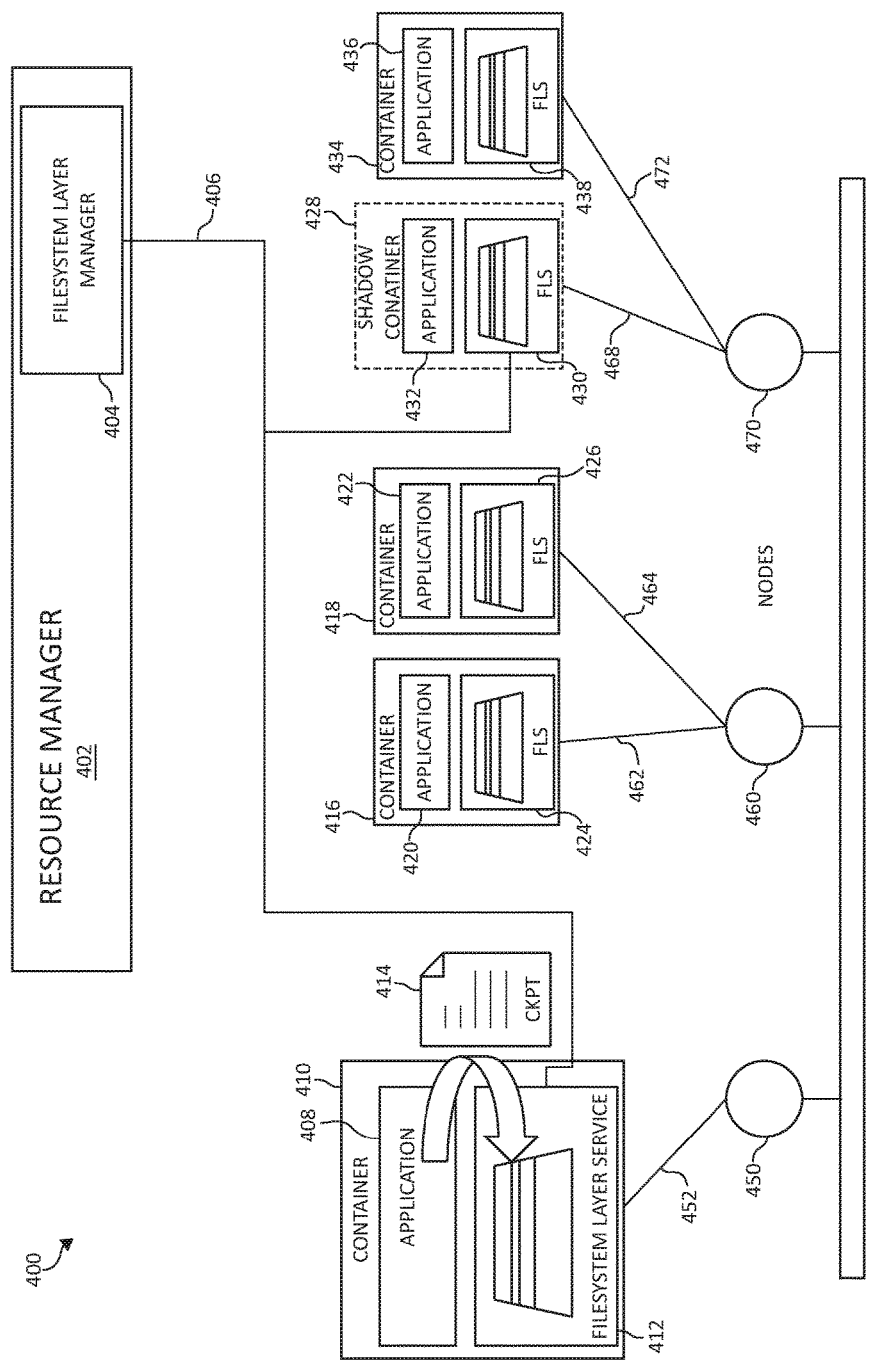
FIG. 4 is an additional block diagram depicting various components functioning in accordance with aspects of the present invention.

Turning to FIG. 4, a block diagram of various architecture 400 in which various aspects of the illustrated embodiments may be implemented, is depicted. A resource manager 402 globally supervises various containerized applications among a number of nodes 450, 460, and 470, as depicted. A number of containerized applications (e.g., applications 408, 420, 422, 432, and 436 are contained in containers 410, 416, 418, shadow container 428, and 434 as shown. The various containers are connected at various nodes 450, 460, and 470. For example, the containerized application 408 is coupled via path 452 to node 450 as shown. The containerized applications 420 and 422 are coupled via paths 462 and 464, respectively, to node 460. Finally, the containerized applications 432 and 436 are coupled via paths 468 and 472 to node 470 as shown.

The resource manager 402 incorporates a Filesystem Layer Manager (FLM) 404, to provide a general (global) view of the architecture 400. For example, the FLM 404 may determine on which node 450, 460, 470 to execute a shadow container (e.g., container 428) as will be further described. In a further example of functionality, on reception of a message from an original Filesystem Layer Service (FLS) (e.g., FLS 412) signaling the availability of a new layer, the FLM 404 provides information about the location of a particular shadow container, again as will be further described.

The FLS (e.g., FLS 412) runs in each container (e.g., as FLS 412 in container 410, as FLS 424 in container 416, as FLS 426 in container 418, as FLS 430 in shadow container 428, and as FLS 438 in container 434. As will be further described, the containerized applications (e.g., application 408) may be checkpointed (e.g., checkpoint 414), which is stored in a filesystem layer structure, with the most recent checkpoint designated as the topmost layer of the filesystem layer.

In one embodiment, the FLS (e.g., FLS 412) checks for availability of a new layer (e.g., a new checkpoint 414 written by the application 408). The FLS 412 then signals the FLM 404 of the new layer's availability. When receiving information of the shadow container 428 location, the FLS, for example, migrates the newest (e.g., most recent, topmost) layer to the shadow container 428. Such layering and migration functionality will be further described. Additionally, when running in a shadow container (e.g., shadow container 428), the FLS (e.g., FLS 430) orchestrates a local copy of the distant layer (e.g., checkpoint 414).

The shadow container 428, then, is a copy of the original container (e.g., container 410), in which the application (e.g., application 408) is initially suspended from the application's execution.

Figure 5:
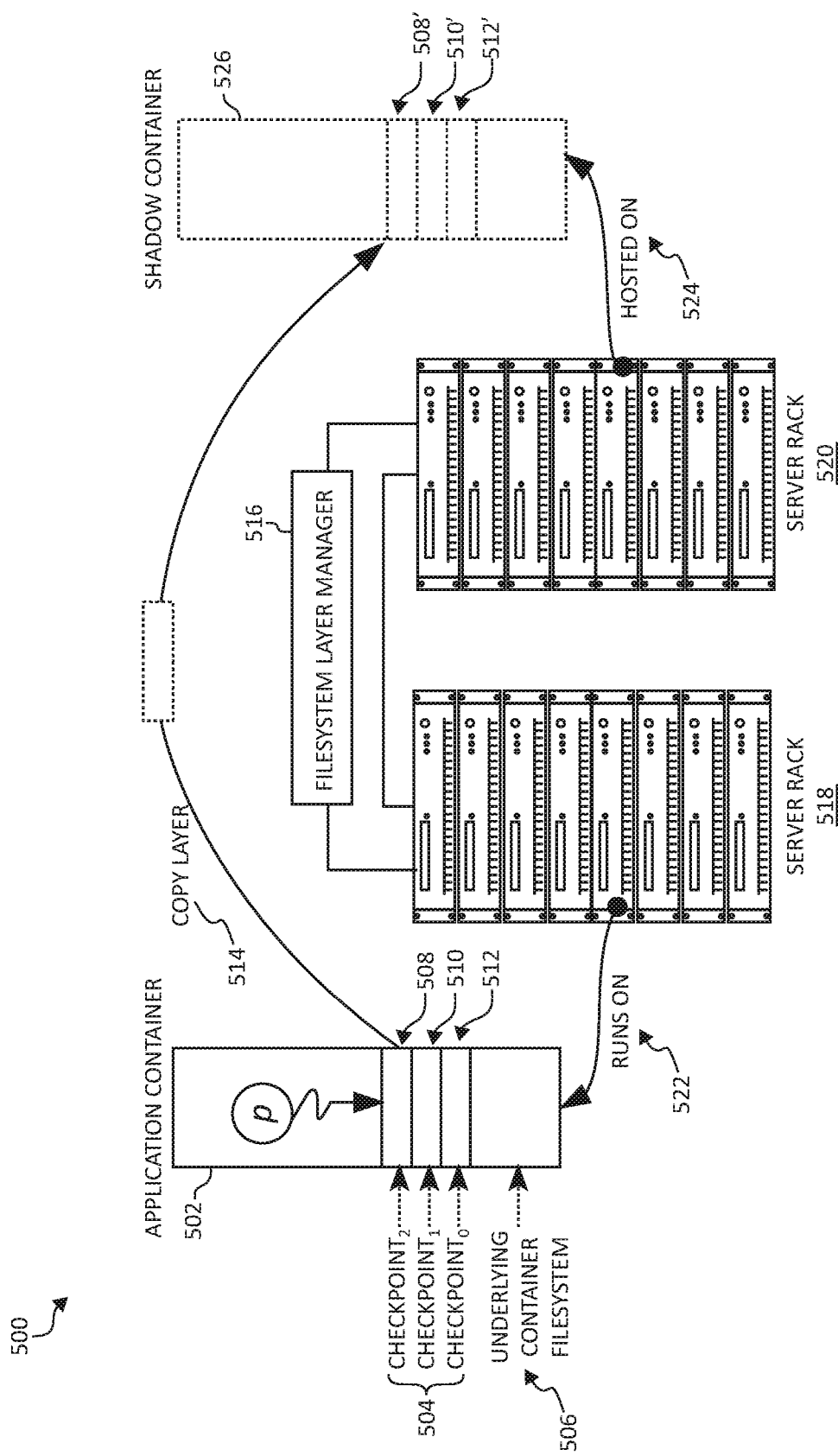
FIG. 5 is an additional block diagram depicting, among other aspects of the present invention, copy functionality between a main container and a shadow container using a Filesystem Layer Manager (FLM)
Figure 6:
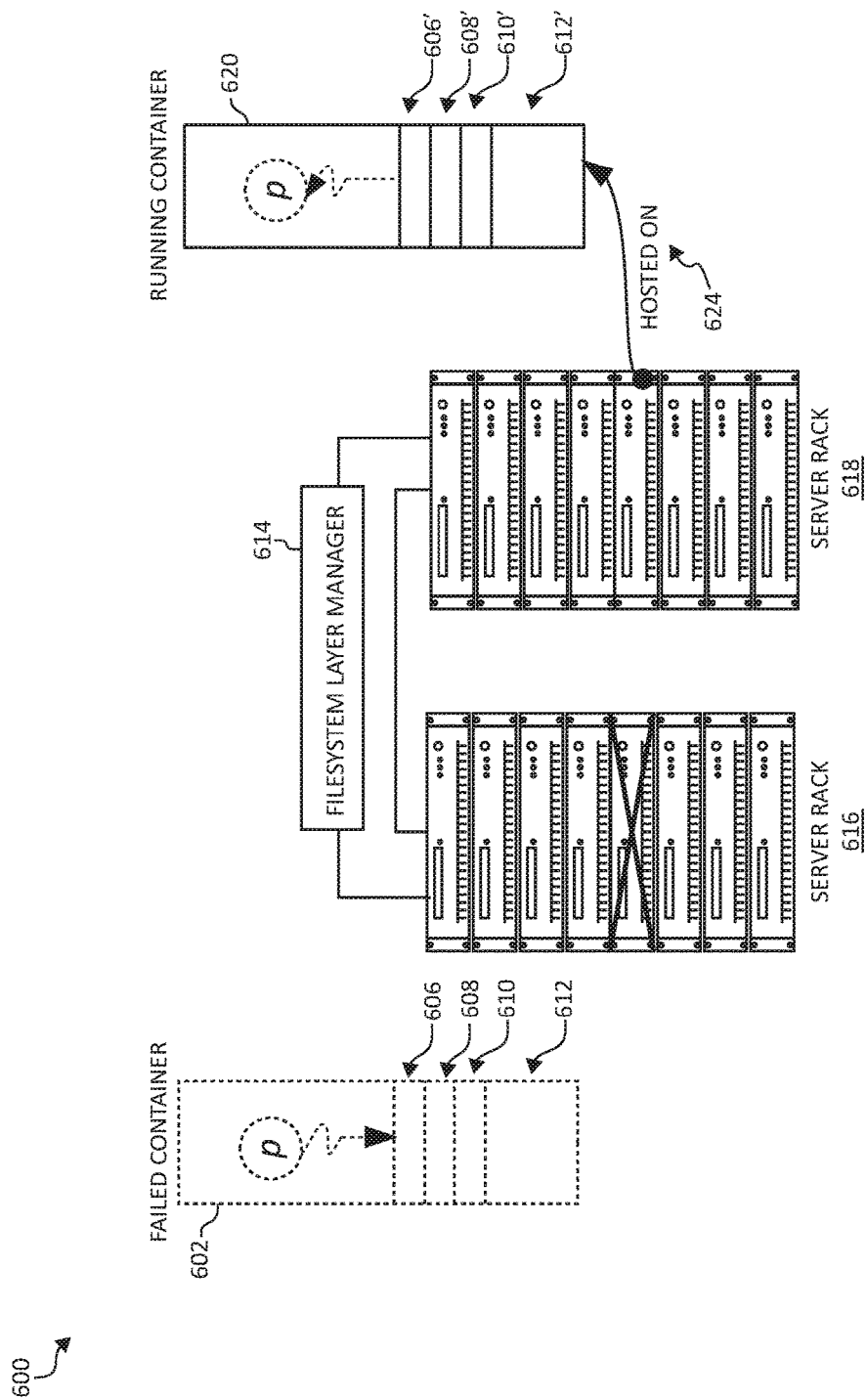
FIG. 6 is an additional block diagram depicting, among other aspects of the present invention, a failover scenario from a main container to a shadow container.

In view of the foregoing architecture 400 present in FIG. 4, consider the following functionality of a practical example as shown in FIGS. 5 and 6 for failure mitigation in containerized applications in a computing environment. First, turning to functionality 500 in FIG. 5, an application container 502 is running on a server in a rack 518 (as shown by reference number 522) in a data center. Process p in the application container 502 is engineered to checkpoint itself at regular intervals. These checkpoints 504 are stored in separate layers 508, 510, and 512 such that the latest (e.g., most recent), checkpoint is the topmost layer 508.

The containerized application 502 also checks for the existence of a local checkpoint when starting. If none exists, the application, including process p, executes normally. If a local checkpoint is determined to exist, then the local checkpoint is loaded, and executed from this data.

The fault tolerance mechanism (as controlled at least partially through the FLM 516) embedded within the data center's system software then copies 514 the application container 502 and the application's checkpoint layers as shown to another node in the data center (possibly on another server rack 520. This is called a shadow container 526, which incorporates the layered checkpoints 508, 510, and 512 that have been previously copied from the main container 502 as checkpoints 508', 510' and 512' respectively.

When the original host/application container 502 fails, the shadow container 526 (as hosted on server rack 520 as shown by functionality 524) is then started from the latest checkpoint layer for the container, bringing each process to the particular state where the process was stopped.

Accordingly, checkpoints 508, 510, 512, etc., are stored in separate layers such that the latest checkpoint is the topmost layer, and as previously mentioned, when the containerized application 502 starts, the containerized application 502 checks for the existence of a local checkpoint (e.g., checkpoint 508). If none exists, the containerized application executes normally. If a checkpoint is found, the checkpoint is loaded, and the containerized application 502 executes from the checkpoint data.

The creation and maintenance of shadow container 526 on another node as shown provides for failure mitigation functionality by use of the various migrated checkpoint layers (e.g., checkpoint layers 508' 510' and 512'). To prepare for and promote such failure mitigation functionality the FLM 516, among other aspects, identifies a target node, copying various checkpoint layers to the shadow container as soon as a new, most recent checkpoint is detected by the FLM 516 in the original containerized application 502.

Turning to FIG. 6, an exemplary failure mode 600 is depicted, in which various aspects of the illustrated embodiments may be realized. Here, a containerized application 602 has failed, including Process p as shown. The failed containerized application 602 includes checkpoints 606, 608, and 610, as well as the underlying container filesystem 612 as shown.

Previous to the failure of the containerized application 602, the FLM 614 copied (as the FLM discovered new, most recent checkpoints), the checkpoints 606, 608, and 610 to shadow container 620 as checkpoints 606', 608', and 610'. In addition, the shadow container was enabled with the shown underlying container filesystem 612'.

When the containerized application 602 failed on server rack 616, the FLM 614 identified the failure and started the Process p on the shadow container on a separate node (e.g., as hosted by functionality 624 on server rack 618). The Process p then, as it started, checked for the existence of a most recent checkpoint layer, which the Process p identified as checkpoint 606', which was loaded and then executed. The instance of the application in the computing environment then continues unabated.

Figure 7:
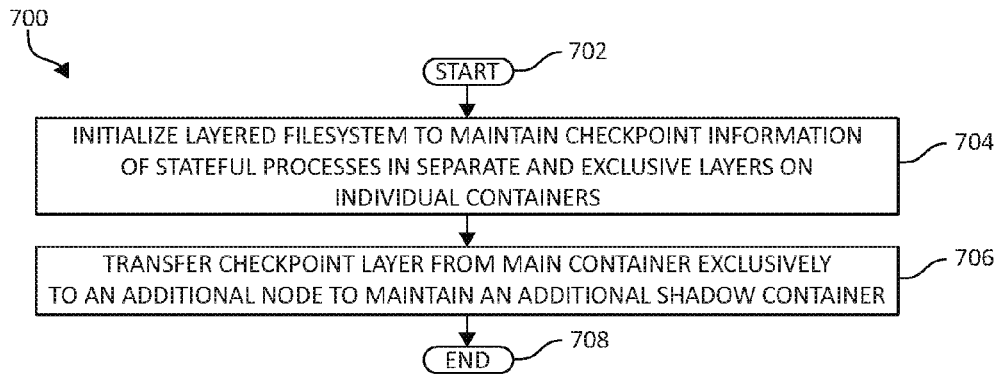
FIG. 7 is a flowchart diagram of an exemplary method for scalable fault tolerance support in a containerized environment by one or more processors, in which various aspects of the present invention may be realized.

Turning now to FIG. 7, a flowchart diagram of an exemplary method 700 for scalable, fault-tolerant support in containerized environments is depicted, in which various aspects of the present invention may be realized. Method 700 begins (step 702) with the initialization of a layered filesystem to maintain checkpoint information of stateful processes in separate and exclusive layers on individual containers (step 704). The checkpoint layer(s) are transferred from the main container exclusively to an additional node to maintain an additional shadow container (step 706). The method 700 then ends (step 708).

Figure 8:
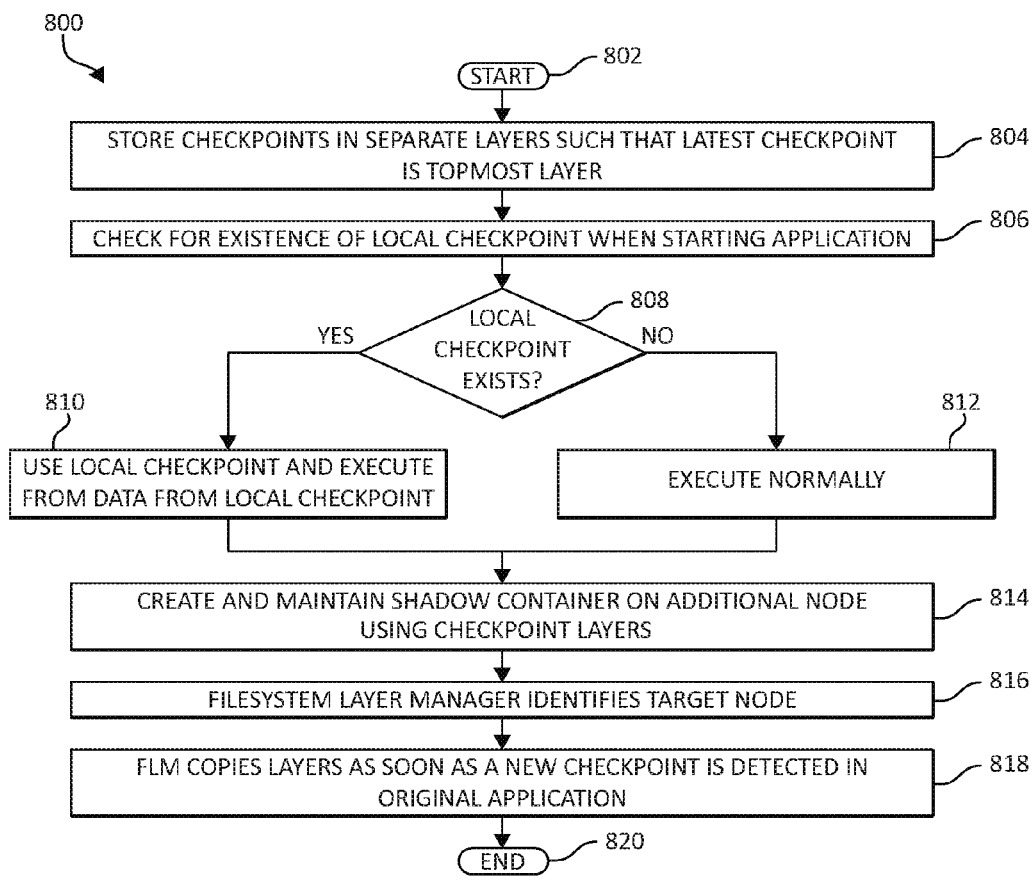
FIG. 8 is an additional flowchart diagram of an exemplary method for scalable fault tolerance support in a containerized environment by one or more processors, again in which various aspects of the present invention may be realized.

FIG. 8, following, is an additional flowchart of an exemplary method 800 for providing scalable, fault-tolerant support in containerized environments by one or more processors, here again in which various aspects of the present invention may be realized. Method 800 begins (step 802) by storing checkpoint(s) in separate layers (e.g., by a FLM), such that a latest, most recent checkpoint is the topmost layer (step 804). When a particular containerized application starts, the containerized application checks for the existence of a local checkpoint (step 806).

Moving to decision step 808, if the local checkpoint is not found to exist, the containerized application executes normally (step 812). Alternatively, if the local checkpoint is identified, the checkpoint data is loaded and executed from as previously described (step 814). Moving to step 814, the FLM creates and maintains a shadow container on an additional node by identifying a target node (step 816), and migrating the respective checkpoint layer(s) from the main container to the shadow container, such as when a new, most recent checkpoint is detected in the original container (step 818). The method 800 then ends (step 820).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing failure tolerance to containerized applications by one or more processors, comprising:
   initializing a layered filesystem to maintain checkpoint information of stateful processes in separate and exclusive layers on individual containers;
   transferring a most recent checkpoint layer from a main container exclusively to an additional node to maintain an additional, shadow container;
   implementing a maintenance schedule for the main and shadow containers, including transferring additional checkpoint layers at regular intervals; and
   organizing the most recent checkpoint layer and additional layers such that the most recent checkpoint layer is a topmost layer.

2. The method of claim 1, further including starting a failed process from the most recent checkpoint layer on the shadow container.

3. The method of claim 1, further including upon starting one of the containerized applications, determining whether one of the most recent checkpoint layer or additional checkpoint layers exists locally on the main container, otherwise loading the most recent checkpoint layer from the shadow container on the additional node.

4. The method of claim 1, further including initializing a filesystem layer service (FLS) that:
   determines, following a failure of the main container, which node to execute the shadow container, or
   signals the availability of a new checkpoint layer to the additional node.

5. The method of claim 4, further including, subsequent to executing the shadow container, orchestrating a local copy of the most recent checkpoint layer on the node in which the shadow container is executed.

6. A system for providing failure tolerance to containerized applications, comprising:
   one or more processors, that:
     initialize a layered filesystem to maintain checkpoint information of stateful processes in separate and exclusive layers on individual containers,
     transfer a most recent checkpoint layer from a main container exclusively to an additional node to maintain an additional, shadow container,
     implement a maintenance schedule for the main and shadow containers, including transferring additional checkpoint layers at regular intervals, and
     organize the checkpoint layer and additional layers such that the most recent checkpoint layer is a topmost layer.

7. The system of claim 6, wherein the one or more processors start a failed process from the most recent checkpoint layer on the shadow container.

8. The system of claim 6, wherein the one or more processors, upon starting one of the containerized applications, determining whether one of the most recent checkpoint layer or additional checkpoint layers exists locally on the main container, otherwise loading the most recent checkpoint layer from the shadow container on the additional node.

9. The system of claim 6, wherein the one or more processors initialize a filesystem layer service (FLS) that:
- determines, following a failure of the main container, which node to execute the shadow container, or
- signals the availability of a new checkpoint layer to the additional node.

10. The system of claim 9, wherein the one or more processors, subsequent to executing the shadow container, orchestrate a local copy of the most recent checkpoint layer on the node in which the shadow container is executed.

11. A computer program product for providing failure tolerance to containerized applications by one or more processors, the computer program product comprising a non-transitory computer-readable storage medium having computer-readable program code portions stored therein, the computer-readable program code portions comprising:
- an executable portion that initializes a layered filesystem to maintain checkpoint information of stateful processes in separate and exclusive layers on individual containers;
- an executable portion that transfers a most recent checkpoint layer from a main container exclusively to an additional node to maintain an additional, shadow container;
- an executable portion that implements a maintenance schedule for the main and shadow containers, including transferring additional checkpoint layers at regular intervals; and
- an executable portion that organizes the most recent checkpoint layer and additional layers such that the most recent checkpoint layer is a topmost layer.

12. The computer program product of claim 11, further including an executable portion that starts a failed process from the stored checkpoint layer on the shadow container.

13. The computer program product of claim 11, further including an executable portion that, upon starting one of the containerized applications, determines whether one of the most recent checkpoint layer or the additional checkpoint layers exists locally on the main container, otherwise loading the checkpoint layer from the shadow container on the additional node.

14. The computer program product of claim 11, further including an executable portion that initializes a filesystem layer service (FLS) that:
- determines, following a failure of the main container, which node to execute the shadow container, or
- signals the availability of a new checkpoint layer to the additional node.

15. The computer program product of claim 14, further including an executable portion that, subsequent to executing the shadow container, orchestrates a local copy of the most recent checkpoint layer on the node in which the shadow container is executed.

* * * * *